O. F. GRANLUND.
MACHINE FOR FORMING HOLLOW CONTAINERS FOR CONFECTIONERY.
APPLICATION FILED AUG. 24, 1914.

1,236,837.

Patented Aug. 14, 1917.
2 SHEETS—SHEET 1.

WITNESSES:
H. E. Hartwell
Caroline N. Willis

INVENTOR.
Oscar F. Granlund.
BY Chapin & Co.
ATTORNEY.

O. F. GRANLUND.
MACHINE FOR FORMING HOLLOW CONTAINERS FOR CONFECTIONERY.
APPLICATION FILED AUG. 24, 1914.

1,236,837.

Patented Aug. 14, 1917.
2 SHEETS—SHEET 2.

WITNESSES:

INVENTOR.
Oscar F. Granlund.
BY
ATTORNEY.

UNITED STATES PATENT OFFICE.

OSCAR F. GRANLUND, OF SPRINGFIELD, MASSACHUSETTS.

MACHINE FOR FORMING HOLLOW CONTAINERS FOR CONFECTIONERY.

1,236,837.                Specification of Letters Patent.        Patented Aug. 14, 1917.

Application filed August 24, 1914. Serial No. 858,188.

*To all whom it may concern:*

Be it known that I, OSCAR F. GRANLUND, a citizen of the United States of America, residing in the city of Springfield, county of Hampden, and State of Massachusetts, have invented certain new and useful Improvements in Machines for Forming Hollow Containers for Confectionery, of which the following is a specification.

This invention relates to machines for forming hollow containers for confectionery. An object of the invention is to provide apparatus for forming hollow containers, of chocolate or any other suitable material, which are adapted to receive a filling of confectionery or liquid material. A further object is to provide means for forming a hollow container which will be of uniform thickness throughout. Other objects will appear in the detailed description and annexed claims to follow.

In general, the manufacture of coated confections has consisted, heretofore, in the formation of the confection proper in the form of a core or center of creamlike consistency. These cores or centers are subsequently covered with a coating of any suitable material, for example chocolate, by dipping or by subjection to a stream of the coating material. Such methods are commonly employed in the manufacture of chocolate creams, for example. However, such a method, obviously, cannot be employed when the confectionery filling is liquid or semi-liquid in character. My invention, however, allows the use of a liquid filling as well as any of the other fillings commonly employed.

The preferred form of my device comprises a series of mold boards each formed with a plurality of recesses of any desired shaped formed therein, a refrigerating or cooling device, a coating apparatus, and means to support and propel the mold boards through the cooling device and subsequently through the coating apparatus. The coating apparatus comprises a suitable vat or kettle containing the coating material, a plurality of nozzles arranged in adjustable relation immediately below the path of the mold boards, suitable connecting means between the vat and the nozzles, and a pump to force the coating material to the nozzles. In general, the mold boards are first passed through the refrigerating device and thoroughly chilled. Subsequently, they pass to the coating apparatus, and the recesses in the bottom of the board are successively subjected to the coating material issuing from the nozzles. As the coating material comes in contact with the chilled mold boards, it is congealed in the portions adhering to the boards. The congealing action is uniform over the surfaces of the recesses, and a hollow container of uniform thickness throughout is obtained. Any surplus material not congealed passes downwardly to the vat of coating material. By suitably varying the temperatures of the coating material and the mold boards and by varying the pressure of the stream of coating material and the proximity of the nozzles to the mold boards, it is possible to obtain a hollow container of any desired thickness.

The preferred embodiment of my apparatus for forming these hollow containers is illustrated in the accompanying drawings in which—

Figure 3:
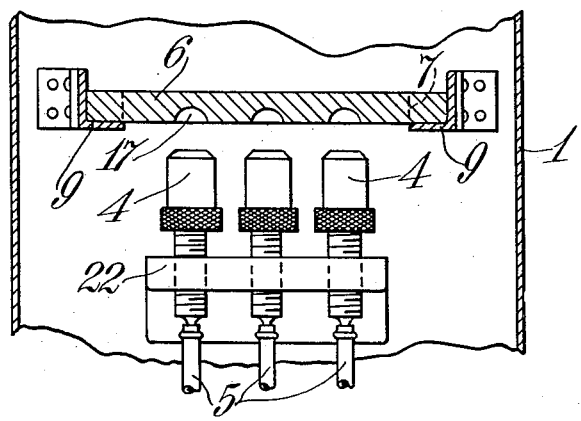
Fig. 3 is a sectional elevation taken on the line 3—3 of Fig. 1 and looking in the direction of the arrows.

Referring to the drawings, 1 is a suitable casing within which is housed the coating apparatus. A steam or hot water jacketed kettle 2 of common form is located within and in the lower part of the casing 1. The kettle 2 is adapted to contain the coating material which may be led therefrom through a suitable pipe 20 to a pump 3. The latter may be of any suitable form and is indicated in the drawings in conventional form only. Passing upwardly from the pump 3 is a pipe 21 to which are connected a plurality of flexible connections 5 (see Fig. 3). The latter are adapted to convey the coating material to nozzles 4 which are supported and vertically adjustable in a bracket 22 attached to the casing 1.

Figure 2:
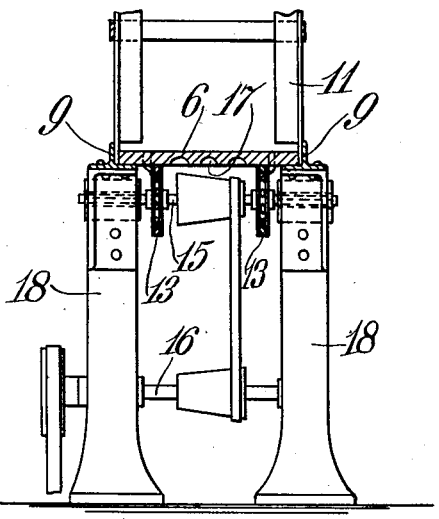
Fig. 2 is a sectional elevation thereof taken on the line 2—2 of Fig. 1 and looking in the direction of the arrows.

Immediately above the nozzles 4 is a horizontal trackway 9 (see Figs. 2 and 3), preferably of angle iron construction, which is adapted to receive and support a plurality of mold boards 6 to be later described. The trackway 9 passes entirely through the casing and extends therefrom through a cooling apparatus 10 of any suitable form to a device for propelling the mold boards along the trackway.

Figure 1:
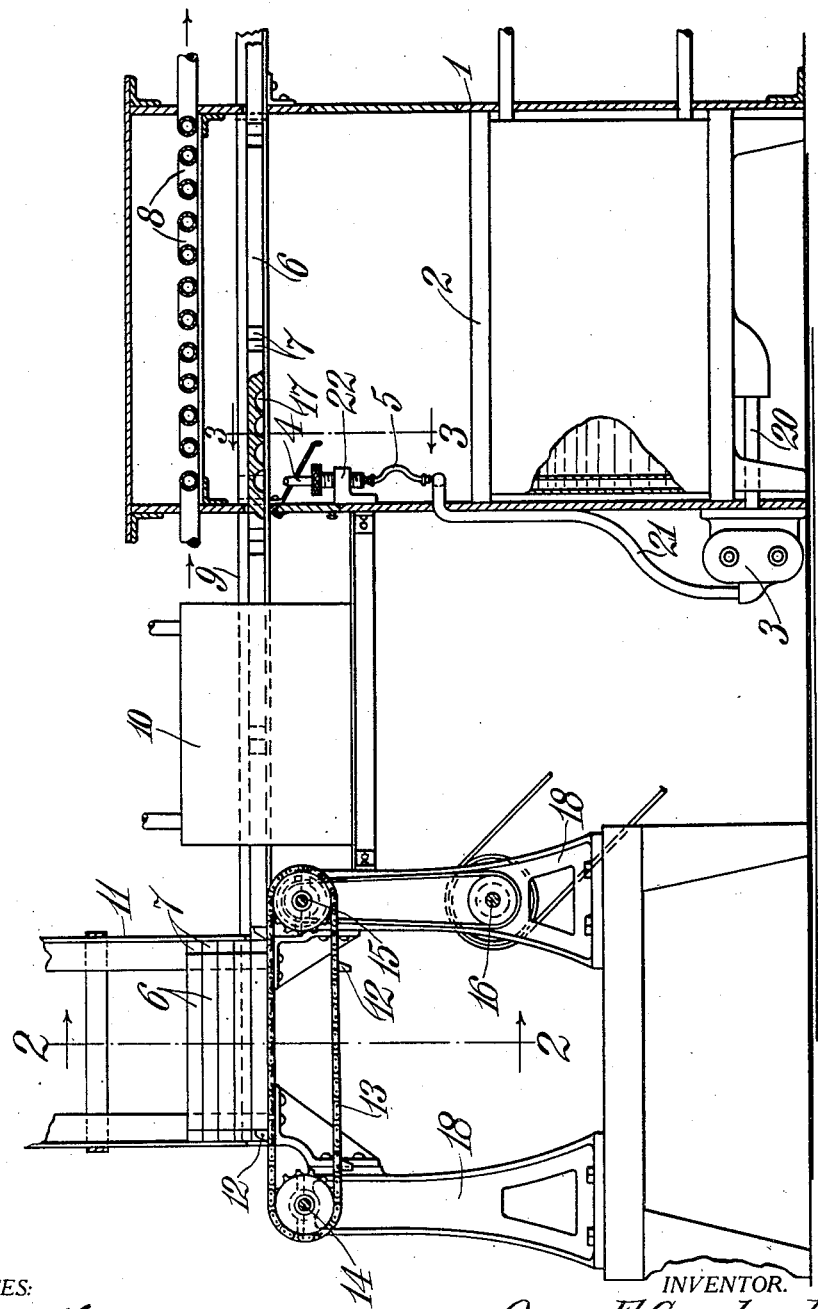
Figure 1 is an elevation partly in section of the complete apparatus.

This device comprises a pair of standards 18 in which are rotatably mounted a pair of shafts 14 and 15 carrying sprocket wheels and chains 13. The shaft 15 is adapted to be driven from the power shaft 16 at variable speeds by the cone pulleys and belt clearly shown in Fig. 2. The standards 18 also support the extension of the trackway 9, previously referred to, and a suitable magazine 11. The latter is preferably constructed of angle iron and is adapted to receive a pile of mold boards 6, as shown in Fig. 1. The latter are notched on each corner as indicated at 7, and this notch extends from each edge of the board 6 inwardly to a position directly over the chains 13. The chains 13 are provided with upstanding lugs 12 which are adapted to engage the board 6 in the notched portion 7 and to propel the same along the trackway 9. These lugs are suitably arranged on the chains 3 to propel without interruption a continuous series of mold boards 6 along the trackway 9, through the cooling apparatus 10 to the coating apparatus in the casing 1.

The under side of the mold boards 6 are formed with numerous rows of recesses 17 (see Figs. 1 and 3) which may be of any desired form. These boards 6 enter and leave the cooling apparatus 10 through horizontal slots just large enough to permit the passage and they are thoroughly chilled just before they enter through a narrow aperture into the casing 1. The nozzles 4 are located closely adjacent the side of the casing 1 on which the boards 6 enter and apply coating material to the surfaces of the recesses. The nozzles 4 are arranged in a transverse row and are equal in number to the rows of recesses 17. Furthermore, each nozzle is arranged to overlap each recess 17, as clearly shown in Fig. 3, so that the entire surface of each recess 17 is covered with coating material. The distance of each nozzle 4 from the mold boards 6 and the pressure of the coating material from the pump 3 is so adjusted that the coating material issues from the nozzles with just sufficient pressure to reach the top walls of the recesses 17. As a matter of fact, the material bubbles up from the nozzles 4 and against the walls of the recesses 17 in a manner analagous to the common drinking nozzle. The material as it strikes and adheres to the walls of the recesses is congealed by the cool mold boards 6, and a hollow container of uniform thickness results. As the coated recesses 17 pass away from the nozzles, most of the surplus material which is uncongealed drops to the bottom of the casing into the kettle 2. The boards leaving the casing through a small horizontal slot pass to any suitable delivering apparatus (not shown). The temperature of the material may be suitably adjusted by the jacketed kettle 2 and the temperature of the casing 1 by the coils 8 located in the upper portion thereof.

Thus, I have provided a unique apparatus for forming a hollow container for confectionery material. It is recognized that many changes and modifications may be made in the structure herein disclosed without departing from the scope of my invention which is more truly defined in the appended claims, than in the foregoing specific description of the preferred form.

What I claim is:

1. A machine for forming a hollow container for confectionery, comprising a suitable casing, a trackway therein, mold boards adapted to move on said trackway and formed with recesses in the undersides thereof, a plurality of nozzles mounted in said casing below said boards and transversely to the path thereof, means to force streams of coating material through said nozzles, means adjacent said casing to cool said boards prior to their entrance to said casing, and automatic means to propel said boards along said trackway first through said cooling means and then through said stream, whereby said recesses are covered with a layer of coating material.

2. A machine for forming a hollow container for confectionery, comprising, a suitable casing, a cooling apparatus, a trackway passing through and connecting said casing and said apparatus, a series of boards on said trackway, each formed with rows of recesses in the under side thereof, a plurality of nozzles adjustably mounted in said casing and below said boards, means for forcing streams of coating material through said nozzles, and means to propel said boards through said cooling apparatus, whereby they are chilled, and thereafter through said casing and across said streams, whereby the coating material striking against said recesses is congealed forming a hollow container.

3. A machine for forming a hollow container for confectionery, comprising, a suitable casing, a cooling apparatus, a trackway passing through and connecting said casing and said apparatus, a series of boards on said trackway, each formed with rows of recesses in the under side thereof, a plurality of nozzles in the casing below said boards, a suitable kettle in said casing adapted to contain the coating material, a pump, suitable connecting means between said kettle and said pump and between said pump and said nozzles, said pump adapted to force streams of coating material through said nozzles, and means to propel said boards through said cooling apparatus and thereafter through said casing and across said streams.

4. A machine for forming a hollow container for confectionery, comprising, a suitable casing, a cooling apparatus, a trackway passing through and connecting said casing and said apparatus, a series of boards on said trackway, each formed with rows of recesses in the under side thereof, a plurality of nozzles in the casing below said boards, a suitable kettle in said casing adapted to contain the coating material, a pump, suitable connecting means between said kettle and said pump and between said pump and said nozzles, said pump adapted to force streams of coating material through said nozzles, and variable speed devices to move said boards in a continuous series through said cooling apparatus and thereafter through said casing and across said streams.

5. A machine for forming a hollow container for confectionery, comprising, a feeding and propelling device, a cooling apparatus and a coating chamber arranged in the sequence named, a trackway extending from said device through said apparatus and through said chamber, mold boards adapted to move on said trackway and formed with recesses in the under sides thereof, a plurality of nozzles in said chamber arranged below and transversely to the path of said boards, a kettle for coating material in said chamber, and means to force streams of coating material from said kettle through said nozzles, all constructed and arranged so that the molds are propelled first through said apparatus, whereby they are chilled and thereafter through said chamber across said streams, whereby said recesses are covered with a congealed layer of coating material, said trackway arranged to convey the boards face downward entirely through said casing, whereby all excess uncongealed coating material may drain back into said kettle.

6. A machine for forming a hollow container for confectionery, comprising, a feeding device, a cooling apparatus and a coating chamber arranged in the sequence named, mold boards having recesses and a nozzle in said chamber through which a stream of coating material may be forced, said device arranged to move the mold boards through said apparatus and thereafter through said chamber with their recesses on the underside thereof and across said stream, all constructed and arranged so that the molds are chilled and so that the coating material striking against said recesses is congealed to form a hollow container.

OSCAR F. GRANLUND.

Witnesses:
ALONZO L. BAUSMAN,
GEORGE S. PERKINS.